(No Model.) 2 Sheets—Sheet 1.

A. J. LASSEN.
MEASURING FAUCET.

No. 572,017. Patented Nov. 24, 1896.

Witnesses:

A. J. Lassen,
Inventor
By Edson Bros,
Attys.

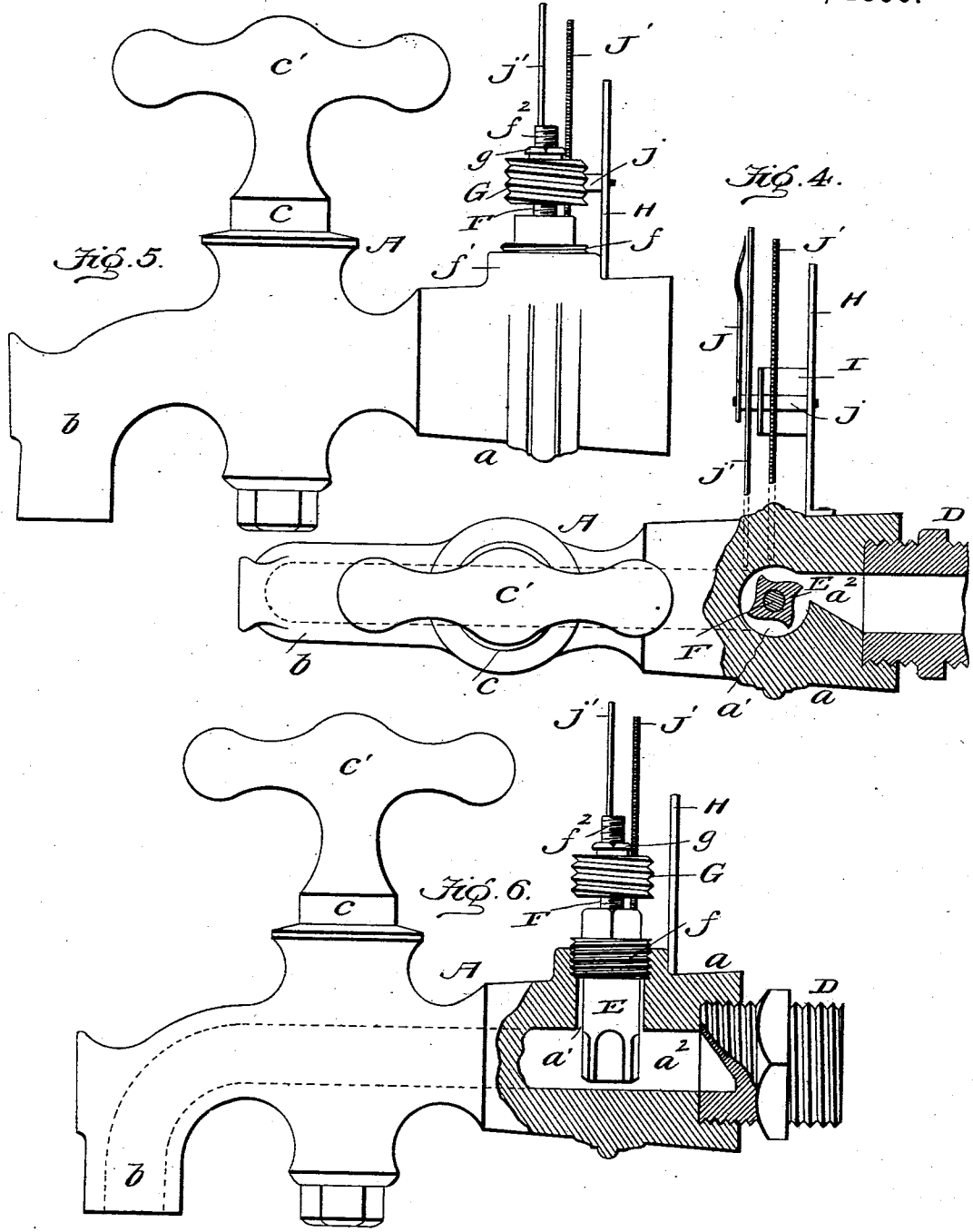

UNITED STATES PATENT OFFICE.

ANDREAS J. LASSEN, OF CHICAGO, ILLINOIS.

MEASURING-FAUCET.

SPECIFICATION forming part of Letters Patent No. 572,017, dated November 24, 1896.

Application filed June 17, 1896. Serial No. 595,873. (No model.)

*To all whom it may concern:*

Be it known that I, ANDREAS J. LASSEN, a citizen of the United States, residing at Chicago, in the county of Cook and State of Illinois, have invented certain new and useful Improvements in Measuring-Faucets; and I do hereby declare the following to be a full, clear, and exact description of the invention, such as will enable others skilled in the art to which it appertains to make and use the same.

My invention relates to improvements in measuring-faucets which are especially designed for use in drawing beer or liquids charged with carbonic-acid gas, and the object that I have in view is to provide a simple and inexpensive mechanism for designating the quantity of liquid drawn from the cask, which indicating mechanism may be applied to ordinary beer-faucets now in common use or be made with specially-constructed faucets to be supplied to the trade.

With these ends in view my invention consists in the novel construction, combination, and arrangement of parts which will be hereinafter fully described and claimed.

To enable others to understand my invention, I have illustrated the same in the accompanying drawings, forming a part of this specification, and in which—

Figure 1:
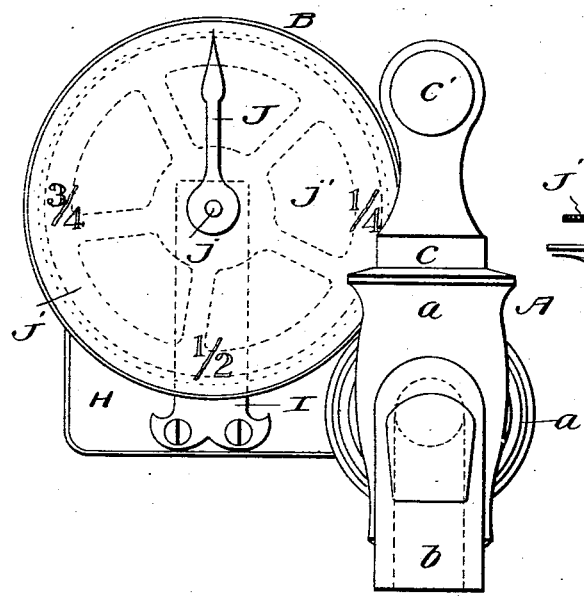
Figure 2:
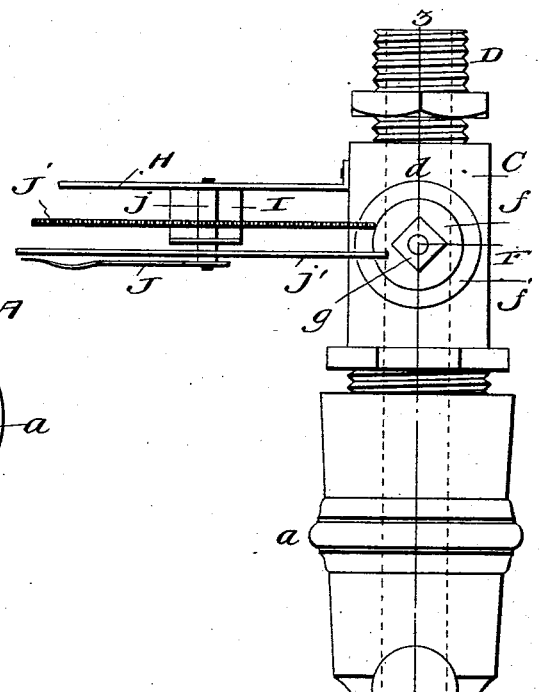
Figure 3:
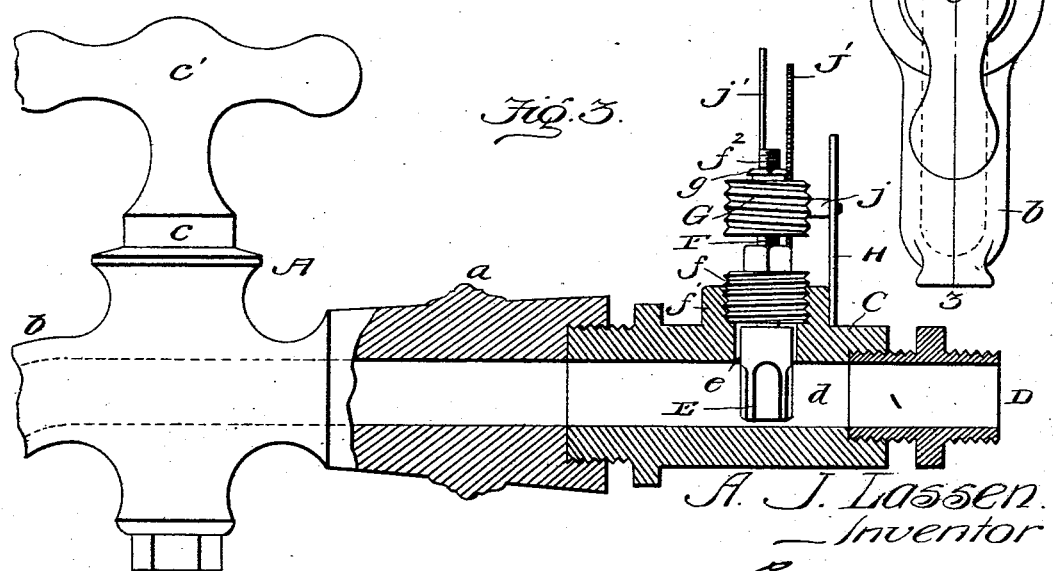

Figure 1 is a front elevation of a beer-faucet with my improved indicator applied thereto. Fig. 2 is a plan view of the same. Fig. 3 is a longitudinal sectional view on the plane indicated by the dotted line 3 3 of Fig. 2. Figs. 4, 5, and 6 are respectively a plan, partially in horizontal section, a side elevation, and a longitudinal sectional view, of another embodiment of my invention, in which the indicator mechanism is made a part of the faucet.

Like letters of reference denote corresponding parts in all the figures of the drawings, referring to which—

A designates a faucet, and B is my indicator arranged for the purpose of indicating the quantity of liquid drawn through the faucet and from the cask to which the faucet is applied.

Referring now more particularly to Figs. 1 to 3, inclusive, the faucet A is of ordinary or well-known construction, consisting of a body $a$, the nozzle $b$, and turning-plug $c$, manipulated by handle $c'$.

The indicator B (shown by Figs. 1 to 3, inclusive) is attached to and carried by a thimble or sleeve C, the forward end of said sleeve being externally threaded to enable the same to be screwed into the internally-threaded rear end of the faucet-body $a$. The thimble or sleeve C is thus arranged in alinement with the body $a$ of the faucet, and the rear end of this thimble is internally threaded for the purpose of receiving a threaded coupling D, by which the thimble is attached to the cask from which the liquid is to be drawn, whereby the coupling and sleeve serve as the means for attaching the faucet and indicator to the cask, and said coupling and thimble form the conduit through which the liquid flows from the cask to the faucet. I take advantage of the flowing of the liquid through the thimble as a means for actuating the pointer of the indicator, and to this end I provide the rotating wheel or vane E within a chamber $e$ of the thimble C, and make the passage $d$ through the coupling in a direction inclined to the longitudinal axis of the coupling, so as to direct the flow of liquid against the wings of the wheel or vane in a manner to rotate the latter. This vane has a series of wings or blades, as shown by the drawings, against which wings the flowing liquid impinges in a manner to rotate the wheel or vane in one direction continuously so long as the plug $c$ is open. This wheel or vane is rigidly attached to the lower end of a vertical shaft F, the latter being journaled in and extended vertically through a bearing provided in a threaded bushing $f$, which is screwed in a suitable boss $f'$, provided on the thimble. The upper protruding end of the vertical vane-shaft is threaded, as at $f^2$, and on it is screwed a worm-wheel G, which is held in place by a check-nut $g$.

Attached to the thimble C is a bar or rod H, which serves as a medium for holding the back plate I in a fixed position on the thimble, or said back plate may be attached directly to the thimble. In front of the back plate is arranged the index-plate $j'$, which, as shown by Fig. 2, may be attached to the thimble C, or it may be fastened in a suitable way to the back plate. In the back plate and index-plate is journaled an arbor $j$. This arbor $j$ carries the pointer J, which is arranged to traverse the dial inscribed on the index-plate $j'$, and to said arbor is securely attached the large worm-gear J', which is arranged to mesh directly with the worm-wheel G.

It will be seen that the liquid flowing through the thimble C when the plug $c$ is turned to an open position will so influence the vane or wheel E as to rotate the same and the vertical shaft F, and the shaft turns the gears G J' to cause the pointer to traverse the dial and indicate thereon the quantity of liquid drawn from the cask, the dial being suitably inscribed with figures or other characters denoting the quantity of liquid passing through the faucet. It will also be noted that in the embodiment of my invention thus far described it is not necessary to modify the construction of the faucet A in any manner. The thimble and indicator are attached together to form an article which may be manufactured and sold to persons engaged in dispensing liquids for attachment to ordinary faucets.

In Figs. 4 to 6, inclusive, however, I have illustrated another type of faucet in which the body $a$ is modified in its construction for the purpose of making the indicator a part of the faucet proper. To this end the rear part of the faucet-body $a$ is made with a vane-receiving chamber $a'$, and with a passage $a^2$, which leads in an inclined direction through the rear part of the faucet-body, so as to properly direct the flowing liquid against the wings or blades of the wheel or vane. The upper end of the vane-chamber $a'$ in the faucet-body $a$ is closed by the threaded bushing $f$, having a bearing for the vertical shaft F, on the threaded end of which is secured the worm G, that meshes with the worm-wheel J'. The shaft of this worm-gear is journaled in bearings on the back plate attached to the body $a$, and said arbor also carries the pointer J, which traverses the dial inscribed on the index-plate $j'$, which, as indicated by dotted lines in Fig. 4, may be also attached to the faucet-body $a$.

In my improved faucet the liquid is directed as it flows out of the cask in a horizontal path inclined to the longitudinal axis of the faucet and to one side of the vertical axis of the shaft which carries the vane or wheel E, in order that the liquid may impinge against the wings of the rotatable vane in a manner to propel and turn the vane. This end is attained, but without giving the liquid an ascent or rise from a horizontal plane, by making the liquid-passage inclined in a horizontal direction and at an angle to the axial line of the faucet, as shown by the drawings.

Having thus fully described my invention, what I claim as new, and desire to secure by Letters Patent, is—

A measuring-faucet provided with a vane-receiving chamber and a liquid-passage which is inclined in a horizontal plane and at an angle to the longitudinal axis of the faucet-body, a rotary vane or wheel situated in said chamber with its vertical axis at one side of the axial line of the liquid-passage, a bushing attached to the faucet, a vertical shaft passing through the bushing and attached to the vane or wheel, a worm on said shaft, a fixed supporting-plate situated at one side of and externally to the faucet, a fixed index-plate, an arbor carrying a pointer, and a worm-gear on the arbor and arranged to mesh with the worm on the vertical shaft, as and for the purposes described.

In testimony whereof I affix my signature in presence of two witnesses.

ANDREAS J. LASSEN.

Witnesses:
EMIL C. LANDIN,
CONSTANTIN HANSEN.